US005257164A

United States Patent [19]
Perez et al.

[11] Patent Number: 5,257,164
[45] Date of Patent: Oct. 26, 1993

[54] COUNTER-TOP TOUCH-SCREEN INTERFACE TERMINAL CHASSIS HAVING A PLURALITY OF POSITIONS

[75] Inventors: Juan M. Perez; Thomas R. Mast, both of Austin, Tex.

[73] Assignee: Compuadd Corporation, Austin, Tex.

[21] Appl. No.: 960,535

[22] Filed: Oct. 13, 1992

[51] Int. Cl.⁵ .............................................. H05K 5/02
[52] U.S. Cl. ........................... 361/395; D14/105; D14/113; 361/681; 361/683
[58] Field of Search ............ 364/403, 405, 708, 709.1, 364/709.11; D14/105, 113, 100, 107; D18/4; 361/380, 390–395, 399, 415

[56] References Cited
U.S. PATENT DOCUMENTS

| | | | |
|---|---|---|---|
| 4,989,167 | 1/1991 | Kapec et al. | 364/708 |
| 5,083,290 | 1/1992 | Hosoi | 364/708 |
| 5,115,107 | 5/1992 | Crooks et al. | 364/405 X |
| 5,157,585 | 10/1992 | Myers | 361/380 |

Primary Examiner—Leo P. Picard
Assistant Examiner—Michael W. Phillips
Attorney, Agent, or Firm—Baker & Botts

[57] ABSTRACT

A chassis for a counter-top touch-screen interface terminal associated with a central processing unit has a lower housing and an upper housing. The upper housing engages and rests on the lower housing and includes a touch-screen for communicating information that is with the central processing unit, a customer display for displaying information that is communicated through the touch-screen, and a swipe reader for receiving a card having information usable by the central processing unit A socket pluggably receives a terminal cable for carrying power to the terminal and communicating signals with the central processing unit The socket is positioned within a recess of the upper housing From the chassis, a slide bar protrudes to slidably engage the upper housing with the lower housing. Also, a slide guide protrudes from the upper housing to restrict side translational movement of the upper housing relative to the lower housing. An adjustment bar from the upper housing selectively engages one of a plurality of adjustment detents in the lower housing as the upper housing engages and rests on the lower housing to provide one of a variety of selectable fixed viewing angles of the touch-screen.

8 Claims, 2 Drawing Sheets

COUNTER-TOP TOUCH-SCREEN INTERFACE TERMINAL CHASSIS HAVING A PLURALITY OF POSITIONS

TECHNICAL FIELD OF THE INVENTION

The present invention relates to computer chassis and, more particularly, to a counter-top touch-screen interface terminal chassis having a plurality of positions and that provides a simplified multi-user interface capable of touch-screen, menu-driven and other applications.

BACKGROUND OF THE INVENTION

In businesses where a clerk or attendant interfaces with a customer as the customer purchases from a variety of pre-specified products or services, it is useful to have a computer interface terminal to record the customer's selections. Environments in which interface terminals are useful include fast food restaurants and hotel check-in desks, for example. Present interface terminal chassis, however, are complicated devices having a LED or other type of screen that shows the attendant's input and another screen display that shows to the user information relating to what the user purchased. These often have hinges and other joints to move the screens and displays so that the clerk and the customer can more easily see them. If moved too much, however, these hinges and joints can break. A failure in any such joint effectively renders the interface terminal chassis and, therefore, the terminal itself, inoperative.

In a fast food or food service environment, often times drinks and other food may drip and fall on terminal. The liquid from the drinks and moisture and liquids from food can seriously damage circuitry within the interface terminal chassis. Another problem with existing terminal chassis is that they expose numerous cables outside the chassis. These cables, even if protected by some form of or sheath can develop internal leaks, and water or drinks flow. Additionally, because of the many wires, replacement the terminal or work on the chassis can be difficult in an operating fast food restaurant, cafeteria or other food service environment. In essence, therefore, there is substantial room for improvement in the area of counter-top user interface terminals.

In particular, there is a need for an improved counter-top customer interface terminal that is simple to use and that reduces significantly the number of hinges and other mechanical ways to adjust the screen and display positions.

There is a need for an improved counter-top interface terminal that has a minimum number of exposed cables and that is impervious to liquids falling on the unit.

There is a need for a counter-top touch-screen interface terminal that easily permits an attendant to respond to the requests of a customer in business such as fast food restaurants, cafeterias, and other food service environment. If satisfied, such an apparatus could easily provide similar solution to other types of businesses.

SUMMARY OF THE INVENTION

The present invention, accordingly, provides a counter-top, touch-screen interface terminal that overcomes or reduces disadvantages and limitations associated with prior customer interface terminals.

One aspect of the invention is a counter-top touch-screen interface terminal chassis that includes a lower housing and an upper housing. The upper housing engages and rests on the lower housing. The upper housing includes a touch-screen for communicating information with a central processing unit and a customer display for displaying selected information communicated through the touch-screen. The chassis also includes a swipe reader for receiving a card having information useable by the central processing unit. A socket in the chassis receives a pluggable terminal cable for carrying power to the terminal and communicating signals with the central processing unit. The socket is positioned within a recess of the upper housing that receives the pluggable terminal cable. The upper housing holds circuitry associated with the touch-screen, the customer display, the swipe reader and the terminal cable.

A slide bar protrudes from the upper housing to slidably engage the upper housing with the lower housing. Also, a slide guide protrudes from the upper housing to restrict side translational movement of the upper housing relative to the lower housing. An adjustment bar protrudes from the upper housing to engage one of a plurality of adjustment detents in the lower housing as the upper housing engages and rests on the lower housing. This provides a variety of selectable viewing angles of the touch-screen.

The upper housing also includes a compartment within its interior that separates the swipe reader from the remaining portions of the upper housing. This prevents debris and liquids from entering the upper housing remaining portions when such debris may enter the swipe reader slot on the upper housing. This prevents the liquid or debris from effecting circuitry within the upper housing.

The lower housing includes a slide bar slot for receiving the slide bar so that the slide bar slidable engages the upper housing in the lower housing. A terminal cable slot within the lower housing receives the terminal cable and permits the terminal cable to make a hidden connection with the socket. A weight within the lower housing restrains movement of the lower housing upon disengagement of the adjustment bar from the adjustment detents.

Technical advantages of the present invention are numerous. They include easier maintenance due to a simplified chassis, easier fabrication due to fewer parts that make up the chassis. Also maintenance for the chassis at its point of use, i.e., at the counter-top, is much simpler than with prior chassis. The present invention is modular with respect to the upper housing and lower housing. If a malfunction occurs in the upper housing, the upper housing may be simply electrically disconnected and removed from the lower housing. The lower housing has no moving parts and has no electronic circuitry within it. Thus, if any electrical or circuitry failure occurs, all that is necessary is to pick up, disengage, and remove the upper housing. Immediately thereafter a substitute upper housing may be installed with all of the functionality of the previous upper housing.

Another technical advantage of the present invention is that it has no hinged moving parts. The top housing slides in a groove and rests on the lower housing. The relationship between the upper housing and the lower housing causes the touch-screen to tilt to one of numerous users-selectable positions.

Another technical advantage of the present invention is that it provides easy access to a touch-screen for the attendant to input the customer's selections. A screen on the reverse side the terminal chassis shows the customer what the customer purchased additionally, the chassis includes a swipe reader for reading a magnetic or bar code card. This provides a new level of functionality that previous customer interface terminals do not provide.

Yet another technical advantage of the present invention is that it is easily adaptable to environment, where a customer may himself or herself use the terminal without an attendant to make choices from menus and sub-menus of specific items that the customer may buy. This may result of substantial cost savings for businesses that have an interest in customer-operated counter-top interface terminals.

BRIEF DESCRIPTION OF THE DRAWINGS

The invention and its modes of use and advantages are best understood by reference to the following description of illustrative embodiments when read in conjunction with the accompanying drawings wherein.

DETAILED DESCRIPTION OF THE INVENTION

The preferred embodiment of the present invention is best understood by referring to the FIGUREs wherein like numerals are used for like and corresponding parts of the various drawings.

Figure 1:
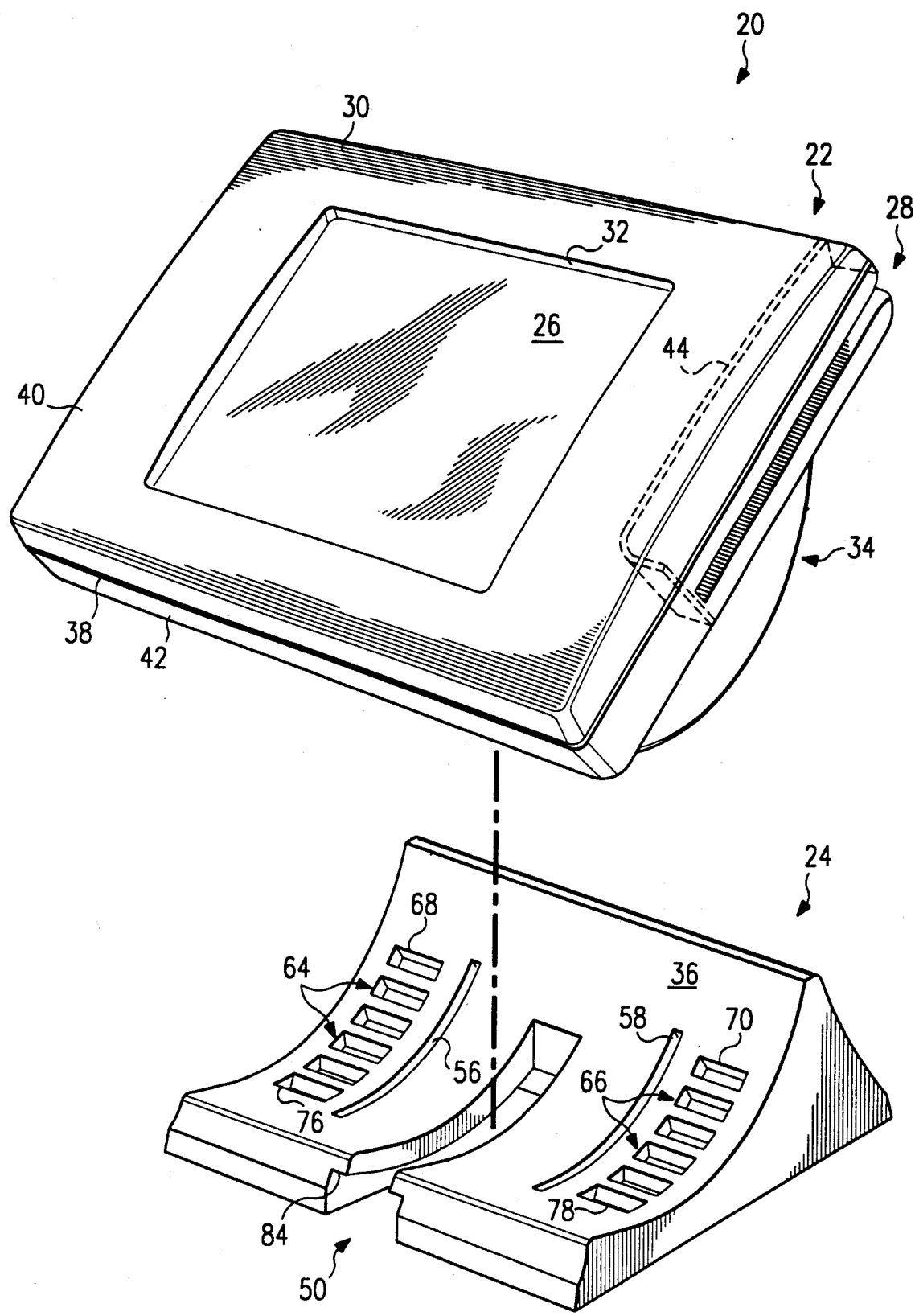
FIG. 1 provides an exploded view the counter-top touch-screen interface terminal chassis of the preferred embodiment to illustrate the relationship between the upper housing and the lower housing.

FIG. 1 shows the preferred embodiment of counter-top touch-screen interface terminal chassis 10 including upper housing 22 and lower housing 24. Upper housing 22 permits communicating information with a remote central processing unit (not shown) via touch-screen 26 of upper housing 22. Also part of upper housing 22 is swipe reader 28 for receiving a magnetic stripe card, a bar-code card or other similar data or information processing card to provide information through the terminal to the central processing unit. Touch-screen 26 rest within frame 30 of upper housing 22 and is bounded by interframe 32. The bottom portion 34 of upper housing 22 is a curved shape that is formed to rest within the curved surface 36 of lower housing 24. Upper housing 22 also includes water-tight boundaries to prevent liquids from entering upper housing 22. These water-tight boundaries may include an O-ring (not shown) placed around and within upper housing 22 to seal touch-screen 26 from liquids. Also, portion 38 that surrounds upper housing 22 joins upper segment 40 of upper housing 22 with a lower segment 42. Within upper housing 22 is barrier 44 that prevents debris and liquids that may drop inside swipe reader 28 from entering and affecting electronic circuitry within upper housing 22.

Figure 2:
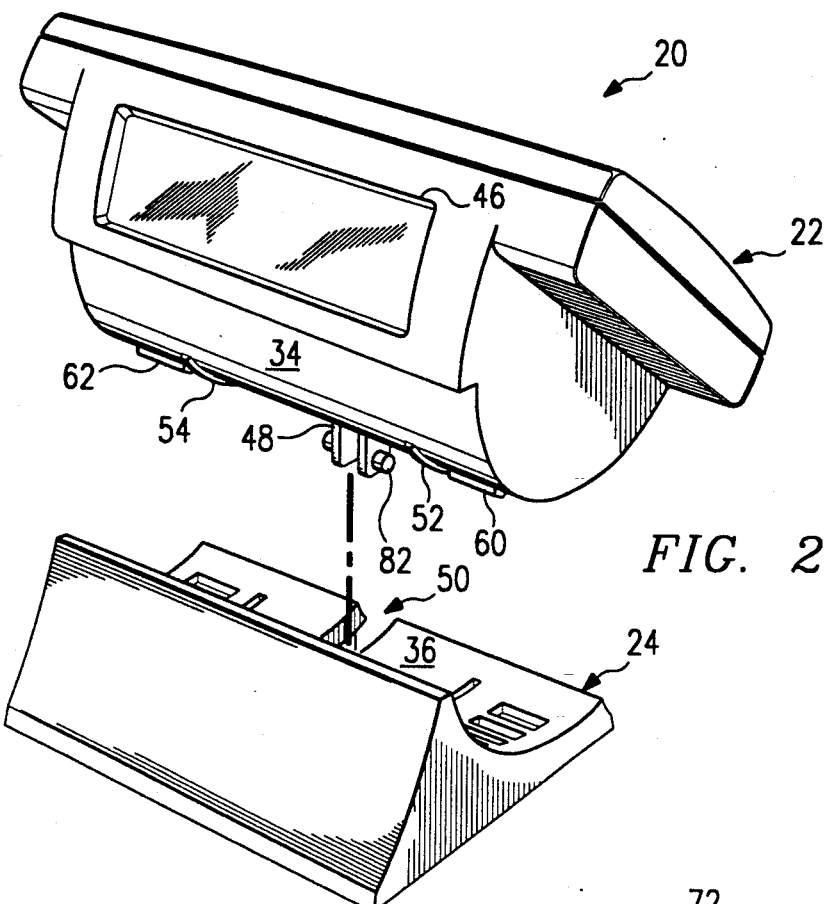
FIG. 2 provides a back-side view of the preferred embodiment to illustrate features such as the customer display.

With reference to FIG. 2, on the reverse side of upper housing 22 can be seen customer display screen 46 and curved portion 34 that receives curved surface 36 of upper housing 22 protruding from curved surface 36 is slide bar 48 that engages slide bar slot 50 of lower housing 24. Slide bar 48 slidable engages slide bar slot 50. Pin 82 fits beneath edge 84 of slide bar slot 50 to hold upper housing 22 and lower housing 24 together upon lifting upper housing 22 to disengage adjustment bar groups 64 and 66. Slide guides 52 and 54 are, respectively, formed to engage slide guide slots 56 and 58. Additionally, slide bars 60 and 62 an associated to engage one of adjustment bar detent groups 64 and 66, respectively of lower housing 24.

Figure 3:
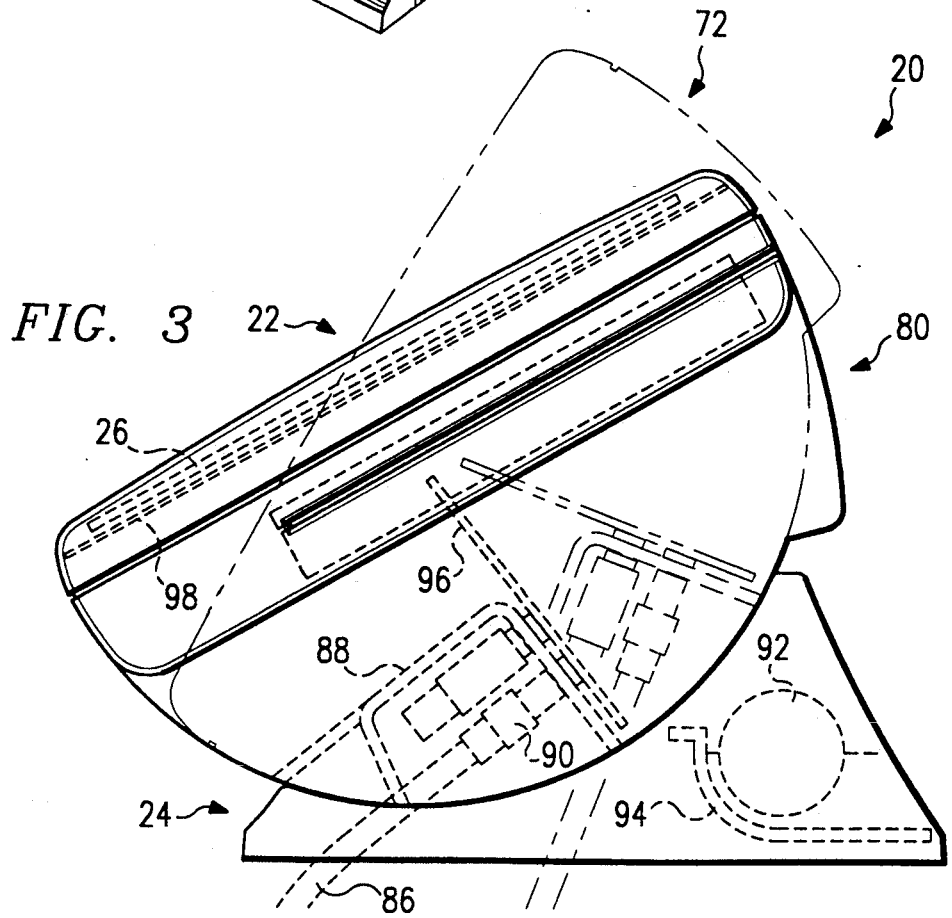
FIG. 3 illustrates the variable adjustment features of the preferred embodiment.

FIG. 3 illustrates two examples of the screen tilting aspect of the preferred embodiment. In particular, while lower housing 24 remains in place, upper housing may be rotated within curved surface 36 to tilt touch-screen 26 to one of numerous user-selectable the user. In the preferred embodiment, the tilt span for upper housing 22 and, hence, touch-screen 26 is approximately 30°. The position of the tilt-screen 26 is determined by the engagement of adjustment bar groups 64 and 66. For example, with adjustment bars 60 and 62, respectively, in adjustment bar slots 68 and 70, upper housing 22 takes the position indicated by reference numeral 72. Conversely, with adjustment bars 60 and 62 engaging adjustment bar slots 76 and 78, upper housing 22 takes the position that reference numeral 80 indicates.

An important feature of the preferred embodiment is the ability to conceal electrical connection cables to circuitry within upper housing 22. This is done in two ways as FIG. 3 illustrates. First, all cables to circuitry within upper housing 22 go through single cable 86. The preferred embodiment uses only one cable for all connections to circuitry within upper housing 22 Secondly, single cable 86 is positioned within recess 88 of upper housing 22 to a socket 90. Socket 90 is spring-loaded and permits direct and simple detachment of cable 86. The arrangement of recess 88 and slot 50 cause cable 86 to be beneath upper housing 22 and hidden by lower housing 24. In fact, whether upper housing is in position 72 or position 80 (or any position therebetween) the arrangement of single cable 86 with lower housing 24 conceals the electrical connections to upper housing 22. There are no electrical connections to lower housing 24. In fact, lower housing 24 may be easily removed from upper housing 22 and rinsed and cleaned away and upper housing 22. As FIG. 3 illustrates, lower housing includes weight 92 that bracket 94 holds. This additional weight causes lower housing 24 to remain in position as the upper housing 22 is lifted to disengage adjustment bar 60 and 62 from adjustment bar detents in groups 64 and 66.

Within upper housing 22 are various circuit boards that support operation of touch-screen 26, customer display 46, swipe reader 28 and signal flow and processing through cable 86. These circuits may include, for example, circuit board 96 and circuitry 98 in the preferred embodiment. Also touch-screen 26 may be supported by either a capacitive or resist circuit. Whether the supporting circuitry is capacitive or resistive in origin will affect the number of circuit boards necessary for upper housing 22 to hold (i.e., if resistive circuitry supports touch-screen 26, an additional circuit board is needed. In any event, upper housing 22 is of sufficient size to contain the necessary circuit boards to operate touch-screen 26, customer display 46, swipe reader 28, and interface circuitry for cable 86.

An important feature of computer chassis 20 of the preferred embodiment is that it is water tight. As such, water, soda, or other drinks may spill on terminal chassis 20 without any detrimental effect to internal circuitry. To keep liquid from entering upper housing from customer display 46, the preferred embodiment uses a plastic or other clear material that is glued or otherwise adhered to the opening for customer display 46. This water-tight opening prevents all liquid that may spill on upper housing 22 from entering its interior portion.

Upper housing 22 does not require a cooling fan or other device to reduce circuit board temperatures. The circuitry to support touch-screen 26 and customer display 46 is specifically designed to not heat that would require a fan or other cooling device. Because a fan is not needed to direct cooling air to circuit boards within upper housing 22, grease and other contaminants do not enter upper housing 22.

A separate and important aspect of the preferred embodiment is a multi-port serial interface link that permits all communication to pass through cable 86. U.S. patent application Ser. No. 07/975,844, filed on Nov. 13, 1992 and entitled "Multi-Port Serial Interface Circuit" by G. Roberts and assigned to CompuAdd Corporation details the circuitry that supports communication between a central processing unit at a remote location and the various devices within upper housing 22 including touch-screen 26, customer display 46, swipe reader 28 which may be either a magnetic card reader or a bar code reader. U.S. patent application Ser. No. 07/975,844 is here expressly incorporated by reference.

Although the present invention and its advantages have been described in detail, it should be understood that various changes, substitutions and alterations can be made herein without departing from the spirit and scope of the invention as defined by the appended claims.

What is claimed is:

1. A chassis for a counter-top touch-screen interface terminal associated with a central processing unit, comprising:
   a lower housing; and
   an upper housing engaging with and resting on said lower housing, said upper housing, comprising: a touch-screen for communicating information with the central processing unit;
      slide bar means protruding from said upper housing for slidably engaging said upper housing with said lower housing; and
      an adjustment bar protruding from said upper housing for selectively engaging one of a plurality of adjustment detents in said lower housing as said upper housing engages and rests on said lower housing to provide one of a variety of selectable fixed viewing angles of said touch-screen;
   said lower housing, further comprising a slide bar slot for receiving said slide bar means so that said slide bar means slidably engages said upper housing with said lower housing.

2. The apparatus of claim 1 further comprising a customer display associated with said upper housing for displaying information communicated through said touch-screen.

3. The apparatus of claim 1 further comprising a swipe reader associated with said upper housing for receiving a card having information usable by the central processing unit.

4. The apparatus of claim 3 further comprising a compartment within an interior portion of said upper housing separating said swipe reader form a remaining portion within said upper housing to thereby prevent debris from entering said swipe reader and affecting remaining interior portions of said upper housing.

5. He apparatus of claim 1, further comprising a socket associated with said upper housing for receiving a pluggable terminal cable for carrying power to said terminal and communicating signals with the central processing unit, said socket positioned within a recess of said upper housing for receiving the pluggable terminal cable and a terminal cable slot associated with said lower housing.

6. The apparatus of claim 1, further comprising slide guide means protruding from said upper housing for restricting side translational movement of said upper housing relative to said lower housing and at least one slide guide slot receiving said slide guide.

7. The apparatus of claim 1 further comprising weight means associated with said lower housing for restraining movement of said lower housing upon disengagement of said adjustment bar from said adjustment detents.

8. A chassis for a counter-top touch-screen interface terminal associated with a central processing unit, comprising:
   a lower housing; and
   an upper housing engaging with and resting on said lower housing, said upper housing, comprising:
      a touch-screen for communicating information with said central processing unit;
      a customer display for displaying information communicated through said touch-screen;
      a swipe reader for receiving a card having information usable by the central processing unit;
      a socket for receiving a pluggable terminal cable for carrying power to aid terminal and communicating signals with the central processing unit, said socket positioned within a recess of said upper housing for receiving the pluggable terminal cable;
      a plurality of holding means within and integral to said upper housing for holding circuitry associated with said touch-screen, said customer display, said wipe reader, and the terminal cable;
      slide bar means protruding from said upper housing for slidably engaging said upper housing with said lower housing;
      slide guide means protruding from said upper housing for restricting side translational movement of said upper housing relative to said lower housing;
      an adjustment bar protruding from said upper housing for selectively engaging one of a plurality of adjustment detents in said lower housing as said upper housing engages and rests on said lower housing to provide one of a variety of selectable fixed viewing angles of said touch-screen;
      a compartment within an interior portion of said upper housing separating said swipe reader from a remaining portion within said upper housing to thereby prevent debris from entering said swipe reader and affecting remaining interior portions of said upper housing;
   said lower housing, further comprising:
      a slide bar slot receiving said slide bar means so that said slide bar means slidably engages said upper housing with said lower housing;
      a terminal cable slot for receiving the terminal cable and permitting the terminal cable to make a hidden connection with said socket;
      at least one slide guide slot receiving said slide guide; and
      weight means for restraining movement of said lower housing upon disengagement of said adjustment bar from said adjustment detents.

* * * * *